United States Patent [19]

Briar et al.

[11] Patent Number: 4,817,155
[45] Date of Patent: Mar. 28, 1989

[54] METHOD AND APPARATUS FOR SPEECH ANALYSIS

[76] Inventors: Herman P. Briar, 10215 Malaga Way, Rancho Cordova, Calif. 95670; Robert W. Cribbs, 4001 Lakeview Dr., Placerville, Calif. 95667

[21] Appl. No.: 4,671

[22] Filed: Jan. 20, 1987

Related U.S. Application Data

[63] Continuation-in-part of Ser. No. 491,976, May 5, 1983, abandoned.

[51] Int. Cl.$^4$ .............................................. G10L 5/00
[52] U.S. Cl. ..................................................... 381/36
[58] Field of Search ........................ 381/42, 43, 51-53

[56] References Cited

U.S. PATENT DOCUMENTS

| 3,222,898 | 5/1967 | Kalfaran | 381/43 |
| 4,092,495 | 5/1978 | Underwood | 381/51 |
| 4,520,499 | 5/1985 | Montlick et al. | 381/43 |
| 4,584,922 | 4/1986 | Kamiya | 381/51 |
| 4,586,193 | 4/1986 | Seiler | 381/51 |

Primary Examiner—Emanuel S. Kemeny
Attorney, Agent, or Firm—Weissenberger & Peterson

[57] ABSTRACT

Speech analysis is performed by synchronizing, with the initiation of glottal pulses produced during the voicing of phonemes, a pitch-independent transform that performs analysis entirely within a pitch period. Analysis is made of the three most dominant formant frequencies of the sound sets involved in the enunciation of voiced phonemes. Peaks in the transform represent formant frequencies. Three peaks are selected from the transform identifying the frequencies with the first, second and third greatest amplitudes. Correlation of the waveform between successive pitch periods detects whether a sound is a vowel, a voiced sibilant, or unvoiced. Unvoiced sound sets are similarly analyzed but the analysis is synchronized with artificially generated synch pulses. The sound sets are analyzed to determine (1) whether the sound is a vowel, a voiced sibilant or an unvoiced sound; (2) the primary formant frequency, i.e. the one with the greatest amplitude; (3) the substantial presence of secondary and tertiary formant frequencies with the next two largest amplitudes, as well as their frequencies; (4) the frequency ratios of the primary to the secondary and the primary to the tertiary frequencies; (5) the decay rate of at least the greatest formant frequency; and (6) the time relationships of these sound sets to one another and to unvoiced sounds. A unique set of phoneme identifications is derived from these factors. Apparatus using these factors for phoneme encoding and speech reproduction from encoded phonemes is disclosed.

21 Claims, 5 Drawing Sheets

METHOD AND APPARATUS FOR SPEECH ANALYSIS

STATEMENT OF RELATED CASES

This application is a continuation-in-part of application Ser. No. 491,976 filed May 5, 1983 now abandoned, and also entitled "Method And Apparatus For Speech Analysis".

This invention relates to speech analysis, and in particular to a system of speech analysis which is capable of discerning and identifying individual phonemes independently of the pitch of the voice and the characteristics of the particular speaker.

BACKGROUND OF THE INVENTION

Speech analysis is currently being done by some method of transforming analog signals, representative of pressure variations in the air, into frequency related information. The pressure variations are sound information being transmitted between a speaker and a listener. The frequency information represents the excitation of various cavities in a speaker's vocal tract by pulses from the vocal cords.

Five current methods of speech analysis are described in printed publications as follows:

(1) Fourier transforms: U.S. Pat. No. 4,038,503 to Moshier;

(2) Filtering and zero crossing detection: Sambur and Rabiner, "A Speaker-Independent Digit Recognition System", *Automatic Speech and Speaker Recognition*, IEEE Press, 1978;

(3) Filtering: U.S. Pat. Nos. 3,646,576 to Thurston, and 3,304,369 to Dreyfus;

(4) Linear prediction: Matchoul, "Linear Prediction: A Tutorial Review", *Speech Analysis*, IEEE Press, 1979;

(5) Dynamic programming: Sakoe and Chiba, "Dynamic Programming Algorithm Optimization for Spoken Word Recognition", *Automatic Speech and Speaker Recognition*, IEEE Press, 1979.

(6) Properties of the Speech Signal: G. Fant, "The Acoustics of Speech", *Speech Analysis*, IEEE Press, 1979.

This prior art approach to speech analysis has the disadvantage of being pitch-dependent, i.e. the components of the frequency transforms are affected by the pitch of the individual speaker's voice. As a result, it is difficult to make a using device, e.g. a computer, respond accurately to many different individuals (particularly adults and children) and to a widely varied vocabulary without considerable adjustment and effort. In fact, no commercially available method is currently capable of recognizing a large vocabulary independently of the speaker.

The prior art does not recognize that the human ear-brain extracts its recognition information for voiced-sounds from the frequency and decay patterns which immediately follow the excitation of the vocal tract by the vocal cord, and essentially ignores the degraded information as the excitation dies away. Consequently, the prior art has failed to recognize that a proper examination of the speech waveform so as to match the human intelligence system must be synchronized with the excitation or glottal pulses.

SUMMARY OF THE INVENTION

The present invention defines a speaker-independent speech recognition system that matches the human ear-brain more closely than the current state of the art in speech recognition. The invention introduces a transform not previously described which transforms independently of pitch and has a constant-percentage frequency separation. This transform is referred to herein as the Logarithmetically Separated, Truncated, Fixed Number of Cycles Transform or LF transform. To use the LF transform it is necessary to locate the beginning of all voiced-speech pitch periods.

A cusp detector is used to detect the beginning of a voiced pulse. A cusp is defined as the point where two sequential curves meet at an angle to each other. To obtain the cusp to be detected in accordance with the invention, the total energy in the spoken sound between 300 and 3000 Hz is measured. This speech energy curve has a maximum in its second derivative exactly at the cusp which signals the beginning of energy input and therefore the beginning of a pitch period.

For voiced sounds, the LF transform is always started at a detected cusp and is carried out for an integral number of cycles of each frequency of the transform. No transform may cross the boundary of the next cusp. This assures sampling at the point where information on formants is maximum and precludes any integration across a phase discontinuity represented by th next cusp. This simple set of rules makes the LF transform independent of pitch and thus matches the human ear-brain transform which also senses speech independent of pitch.

A second major feature of the LF transform is the logarithmic separation between the transform frequencies. For any selected set of LF frequencies, each frequency is calculated by multiplying the next lower frequency by a number such that $F_n = F_{n-1}*(1+k)$ where k is the constant fractional or percentage change desired between frequencies. This matches the capabilities of the human ear-brain in distinguishing sound frequencies.

Whether a sound is voiced or unvoiced is sensed by examining the correlation between successive cusps. Cusps will appear in the energy curve of unvoiced speech but at randomly irregular intervals. If the beginning of each glottal pulse is known through the cusp detector, then the regularity between pulses can be determined by a simple statistical correlation test. The correlation coefficient is calculated between the data starting at two sequential cusps. A correlation coefficient near or equal to 1 indicates the two sound sets are essentially identical and therefore voiced, while a value near 0 indicates unvoiced information. Some sibilants and plosives are voiced at low frequencies and unvoiced at higher frequencies; consequently, separate correlation factors must be determined for the low and high frequency ranges. The non-regularity or randomness characteristic of consonants can alternatively be determined by measuring the phase coherence of the formant frequencies.

Formant frequencies are detected as peaks in the LF transform. The decay parameter $\tau$ can be determined by the ratio of two successive integrations at the formant frequency under consideration, the first for n cycles beginning at the cusp and the second for n cycles beginning one cycle later.

In general, it has been observed that identification of the three most dominant formant frequencies and decay constants suffice in most cases to characterize any vowel, and that the identification of the most dominant frequency component and its decay constant are usually sufficient to characterize any unvoiced consonant. A combination of both in different frequency ranges characterizes voiced sibilants and plosives.

If these parameters are digitally encoded and transmitted, they can be used to reconstitute speech in a clearly intelligible and quite natural-sounding format. Pitch-dependent information such as question format or speaker identification is lost, but can be supplied by also transmitting pitch information, i.e. the average repetition rate of the glottal pulses, as a separate parameter.

It is therefore the object of this invention to provide a system of speech analysis and transmission which requires only narrow bandwidth and is independent of the pitch or tone of the speaker's voice.

It is a further objective of this invention to provide a system of the aforesaid type which relies on an analysis of the frequency ratios and decay constants of natural voice sounds measured in synchronization with cusp in the waveform of voiced sounds.

BRIEF DESCRIPTION OF THE DRAWINGS

FIG. 2b is a block diagram of an alternative embodiment of the apparatus of FIG. 2a;

FIG. 3b is a block diagram of an alternative embodiment of the apparatus of FIG. 3a.

DESCRIPTION OF THE PREFERRED EMBODIMENT

Figure 1A:
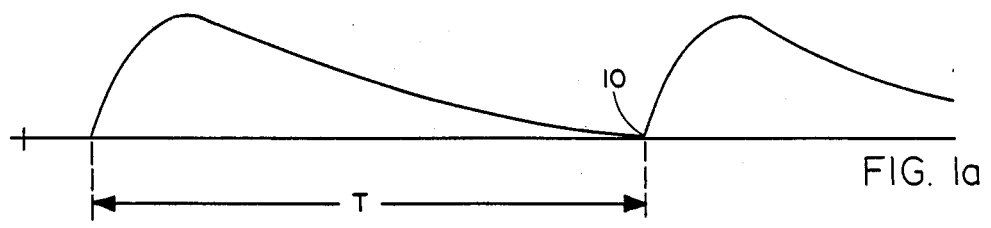
FIGS. 1a-e are time-amplitude diagrams illustrating the total energy and three most dominant formant frequencies of a voiced sound.
Figure 1B:
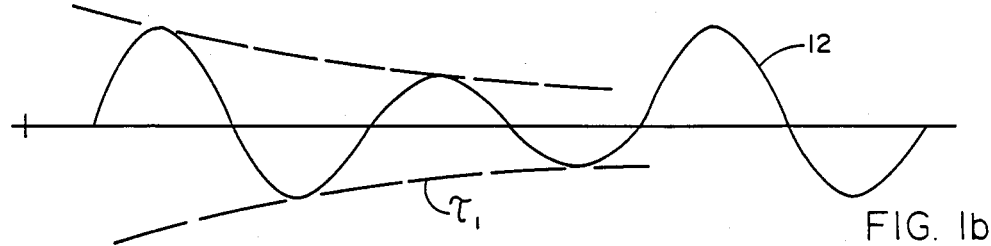
Figure 1C:
Figure 1D:
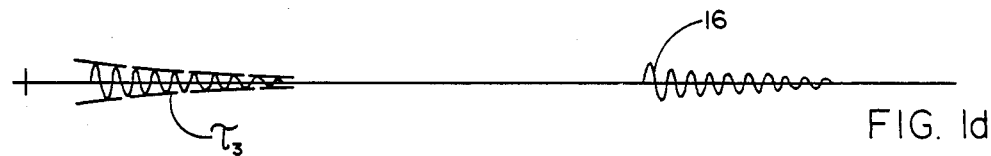
Figure 1E:
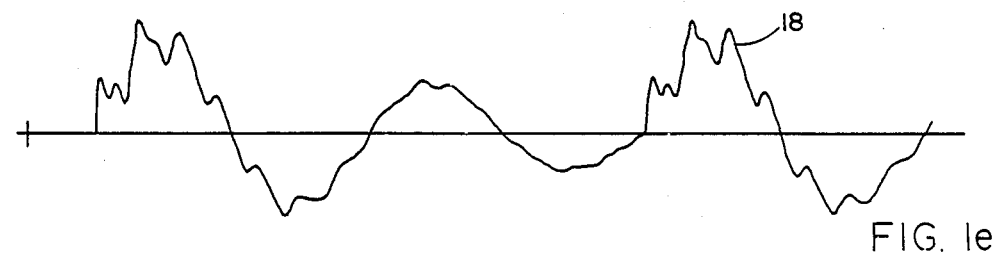

The invention rests on the recognition that each of the thirty-odd speech components of phonemes which make up the English language is uniquely identifiable by only a few speech sound parameters, and by the time relation of speech sounds to one another. A major aspect of the invention is the recognition that the pitch of the voice is not one of the parameters which identify individual phonemes. Consequently, speech recognition by the system of this invention is universal and does not depend on the voice characteristics of the person speaking.

The essential parameters involved in this invention are best described in relation to the recognition of vowels. Vowels (excepting whispered speech) are voiced speech sounds created by a series of glottal pulses energizing the various chambers of the human vocal tract.

Vowels are of two types: basic vowels which are characterized y a single set of sounds (such as the "oo" in boot), and transition vowels which are characterized by a gradual transition from one basic vowel to another (such as "I"). Each basic vowel can be fully characterized by no more than three selected formant frequencies and their respective decay rates.

If the foregoing parameters are measured, all vowels can be uniquely identified by them and by their variation with time. For example, the "e" sound as in the word "be" has a low formant frequency lower than 350 (the exact frequency varies with the speaker) which decays to a predetermined percentage of its value within three periods, and a second formant frequency between the eighth and sixteenth marmonic of the low formant frequency. The "i" sound in "I" is formed by a gradual transition from a primary formant frequency greater than 500 Hz with a two-period decay and no harmonics (the "aw" sound in "paw") to the "e" sound previously described. Auditory recognition of these vowels does not require an assessment of the relative amplitudes or phases of the three most prominent formant frequencies of a sound set; their frequency ratios, decay constants, and their substantial presence or absence is all that matters.

It should be kept in mind that although the glottal pulse repetition rate (i.e. the repetition rate of the cusps in the total energy curve) during the enunciation of vowels is a measure of the pitch of the voice, it has no relation to the formant frequencies which identify a particular voiced phoneme. The primary reason for detecting the cusps in vowels is that they provide a point of reference from which the formant frequencies, amplitudes and decay rates can be measured. Consequently, in accordance with the invention, the detected cusp is a synchronization signal used by the LF transform to measure characteristics inherent in a vowel or a voiced consonant.

Most consonants can be identified by their time relation to vowel sounds and their inherent frequency range such as the high-pitched hiss of the phoneme "s" or the very low-pitched huff of the phoneme "h". Phonemes such as "b", "d", and "g" can be differentiated by the change rate of the sound. In each instance, the soft phoneme such as "b" involves an onset of a vowel sound during the pronunciation of the consonant, whereas the corresponding hard phoneme such as "p" involves the onset of the vowel sound after the pronunciation of the consonant.

A few consonants such as z, v and th, however, are combinations of a voiced sound in the low-frequency range (i.e. below about 1 kHz) and an unvoiced sound in the high-frequency range (i.e. above about 1 kHz). In order to recognize these consonants in the system of this invention, it is necessary to filter the speech signal and perform separate correlation tests in the low-frequency range and the high-frequency range.

The factors identifying the various phonemes of the English language in accordance with this system are shown in Table I. It will be apparent from Table I that all the phonemes can be identified from (1) the presence or absence of vowel sounds; (2) the vowel sounds involved; (3) the non-vowel sounds involved; and (4) the time relationship of their relative occurrence. All of these parameters, including time, are measurable and expressible in digital terms so as to lend themselves to comparison with a digital look-up table in a microprocessor, and consequent individual identification. The syllable as referred to in Table I is a speech element containing a central vowel, and optionally beginning and/or ending with a consonant.

Speech Analysis Apparatus

FIG. 1 shows the relevant wave forms which enter into the recognition of vowel sounds. FIG. 1a shows the total energy curve of the sound being analyzed, which is processed herein to a second derivation to detect the cusp 10. FIG. 1b shows the first formant frequency 12 which decays at a characteristic rate $\tau_1$. FIG. 1c shows the (not always present at detectable levels) secondary formant 14 which decays more rapidly, e.g. at a rate $\tau_2$. FIG. 1d shows the tertiary formant 16 which decays still more rapidly at a rate $\tau_3$ and is of significance in the detection of only some of the vowel sounds. FIG. 1e is the composite of the three formants 12, 14, and 16 represents as close an approximation of the actual voice signal as the human ear can detect. The exact values of the decay constants $\tau_2$ and $\tau_3$ of the second and third formants are useful the recognition of a particular speaker's voice, but they are not required if mere understanding of the speech is required.

Figure 2A:
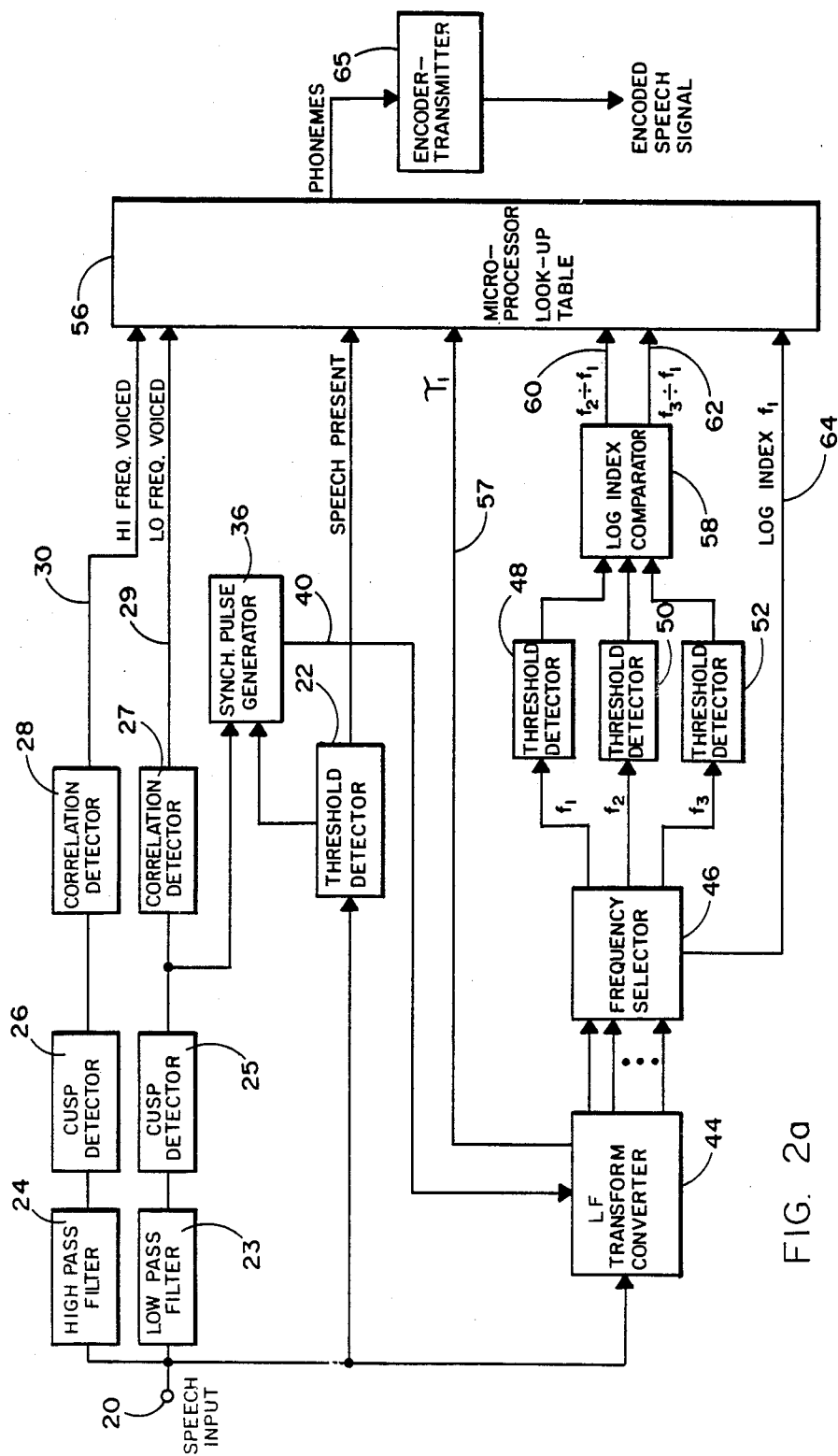
FIG. 2a is a block diagram of a speech analysis apparatus constructed in accordance with this invention.

FIG. 2a is a block diagram of a typical digital analyzer circuit which may be used to analyze speech in accordance with this invention. The speaker's analog speech signal as produced, for example, by a microphone constitutes the speech input 20. The speech input 20 is first applied to a threshold detector 22 which determines whether any speech signals are present or not. As soon as speech signals exceeding a predetermined background noise level are detected, the threshold detector 22 enables the microprocessor 56 so that it can identify and transmit phoneme information.

The speech input 20 is also applied to a pair of filters 23, 24 and cusp detectors 25, 26. The low-pass filter 23 allows the cusp detector 25 to detect cusps in the low-frequency portion of the speech signal, whereas the high-pass filter 24 allows the cusp detector 26 to detect cusps in the high-frequency portion of the speech signal. The boundary between the low-frequency range and the high-frequency range as far as the filters 23, 24 are concerned may be about 1 kHz in the preferred embodiment.

The cusp detectors 25, 26 are essentially differentiators whose output is the positive value of the second derivative of the total energy of the portion of the speech signal which is applied to them. In a voiced sound, the total energy applied to each cusp detector has the shape of the curve of FIG. 1a, and the second derivative of this curve has a sharp positive spike at 10 which recurs at regular intervals. In an unvoiced sound, cusps (and hence spikes in the second derivative) occur at random intervals. Several useful ways to measure energy in the waveform may be used. Least expensive is an absolute value circuit followed by a lossy integrator. More expensive in terms of time and circuitry is a Hilbert transform to shift all frequencies to 90 degrees, then create the modulus of the original and the shifted data.

The pulsing outputs of cusp detectors 25, 26 are applied to correlation detectors 27, 28. The correlation detectors 27, 28 are preferably conventional statistical analysis circuits which are triggered by the outputs of cusp detectors 25 and 26 and generate a correlation factor varying between 1 and 0 depending upon the regularity of the pulses. A correlation factor greater than 0.95 at low frequencies or 0.85 at high frequencies indicates the presence of a voiced sound; a correlation factor smaller than 0.45 indicates an unvoiced sound. Correlation factors between these limits are inconclusive. Consequently, the correlation detectors 27, 28 maintain an output of 1 or 0 on lines 29, 30 (for voiced or unvoiced, respectively) until the opposite output is clearly indicated—usually within two to three pulse cycles.

As long as speech signals above the noise threshold are present, and the signal on either line 29 or line 30 is 1, the conventional pulse generator 36 produces synchronization pulses on line 40 in synchronism with the output pulses of low-frequency cusp detector 25. If both the lines 29, 30 have a 0 signal but speech signals above the noise threshold are present, the pulse generator 36 produces its own synchronization pulses on line 40 at a steady rate preferably corresponding to the average pitch of a normal voice. Each synchronization pulse from generator 36 constitutes the beginning of a speech sound measurement interval. If the signal is voiced, this interval corresponds to the interval between cusps 10 in FIG. 1a; otherwise, the interval is artificially created by pulse generator 36.

The synchronization signal produced by pulse generator 36 is applied to an LF transform converter 44. The converter 44 is an integrating device which calculates by conventional means, for each of its nominal frequencies, the amplitude of that frequency component in the speech signal. Each integration begins at a synch pulse on line 40 and continues for an integral number of cycles of the nominal frequency being analyzed. Generally, the number of cycles in the preferred embodiment is three, but since no integration may extend beyond the next synch pulse on line 40, the number of cycles may have to be smaller for low nominal frequencies. The number of cycles used for integration affects the accuracy of the calculation result, but not the result itself.

Specifically, for each nominal frequency $F_i$, the LF converter 44 calculates the expressions $$SL_i = \int_0^{T_i} S(t) N_s(F_i,t)dt$$

$$CL_i = \int_0^{T_i} S(t) N_c(F_i,t)dt$$

$$PL_i = \sqrt{SL_i^2 + CL_i^2}$$

where
  i = log index of the nominal frequency being examined
  $SL_i$ = LF sine transform
  $CL_i$ = LF cosine transform
  $PL_i$ = LF power transform (the converter output for that nominal frequency)
  N = number of cycles of fi analyzed
  $T_i$ = time interval analyzed = $N/F_i$
  S(t) = speech signal analyzed
  $N_s(F_i,t) = \sin(2\pi F_i t)$
  $N_c(F_i,t) = \cos(2\pi F_i t)$
  t = time The minimum number of nominal frequencies examined by the converter 44 depends on N. The frequencies are in a ratio of $N/(N-1)$ and should preferably span a range from about 150 Hz to 3,500 Hz. An N of 3 to 4 is appropriate for speech analysis. For example, with an N of 3 and a low frequency of 150 Hz, the frequencies $F_i$ would be 150, 225, 337, ..., 3844 for a total of nine frequencies. The $N_s(F_1,t)$ and $N_s(F_i,t)$ are chosen so that $SL_1$ and $CL_1$ are maximized for sine and cosine signals at $F_i$ and are zero or near zero for all other frequencies of the set. $T_i$ must always be less than the time T (FIG. 1) between the pulses on line 40.

If N cycles take less time than the pulse repetition period, the foregoing sine and cosine functions can be used, ad the integration period is variable and equal to the time corresponding to N cycles.

If N cycles of $F_1$ take longer than T, then a more complex function is required to get higher resolution at low frequencies. This function may be estimated by using multiple regression analysis to calculate the function which, when integrated over the period T, has the proper characteristics.

The reason for taking this transform is to estimate the three major formant frequencies and decay constants. To simplify the estimation, the preferred embodiment described herein oversamples, i.e. uses more than the minimum number of frequencies. The preferred embodiment uses $4\sqrt{N/N-1}$ as the ratio of frequencies.

Decay rates for each nominal frequency can be calculated by examining two sets of N cycles displaced by one cycle from one another. For example, the decay rate $\tau_i$ of frequency component $F_i$ is $$\tau_i = \log \frac{a_i}{b_i}$$

where $a_i = PL_i$ for cycles 1–3 of $F_i$
$b_i = PL_i$ for cycles 2–4 of $F_i$

Typically, the LF transform converter 44 in the preferred embodiment might have about twenty-three outputs (as described above, the theoretical minimum is eight but a larger number improves the ability to locate peaks) and would correspondingly integrate about twenty-three nominal frequencies ranging from approximately 150 Hz to approximately 3,500 Hz. As pointed out above, in an LF transform converter, each nominal frequency is not an integral multiple of the smallest frequency as in a Fourier transform, but rather a logarithmic multiple of the smallest frequency. Thus, if the smallest frequency of LF transform converter 44 is 150 Hz, its outputs would be approximately 150 Hz, 173 Hz, 200 Hz, 231 Hz . . . . 3,076 Hz and 3,552 Hz. Each of these frequencies is $4/3 = 1.155$ times the preceding frequency. This distribution approximates the sensitivity of the ear which can distinguish much smaller frequency differences at low frequencies than it can at high frequencies.

Synchronized Fourier transform may be used in this invention for this purpose, and the availability of standard electronic chips may make this desirable. However, LF transforms are considerably more efficient and satisfactory in this invention.

The amplitude outputs for the twenty-three nominal frequencies examined by the LF transform converter 44 are fed into a frequency selector 46. In the preferred embodiment, the frequency selector 46 has twenty-three inputs to match the twenty-three outputs of LF transform converter 44.

In the simplified version of the invention shown in FIG. 2a, the frequency selector 46 has three outputs designated $f_1$, $f_2$, $f_3$. The function of frequency selector 46 is to apply to output $f_1$ the most dominant one of the outputs of LF transform converter 44. Likewise, the frequency selector applies to output $f_2$ the next-most dominant output of converter 44 which is not adjacent to the converter output for $f_1$; and it applies to output $f_2$ the third-most dominant output of converter 44 which is not adjacent to either of the converter outputs for $f_1$ and $f_2$. The reason for the non-adjacency restriction is that a dominant frequency lying between two nominal frequencies may cause high outputs at both of them.

The outputs $f_1$, $f_2$, $f_3$ are approximations, respectively, of the first, second and third largest formant frequencies of the speech sound under consideration. In addition, the frequency selector 46 has an output 64 of the value log index $f_1$, i.e. the number of the LF transform converter output at which $f_1$ appears.

Inasmuch as basic phoneme identification, as far as frequency is concerned, is possible knowing only the greatest frequency, the presence or absence of second and third greatest frequencies, and the frequency ratios of the second and third greatest frequencies to the greatest frequency, the outputs $f_1$, $f_2$ and $f_3$ are applied to threshold detectors 48, 50, 52. Each of these detectors may be conventionally designed to put out the log index of the frequency applied to it whenever that frequency is present with an amplitude greater than a predetermined background noise level.

The outputs of threshold detector 48, 50, 52 are applied to a log index comparator 58 whose outputs 60, 62 preferably are, in digital form, the difference between the log indices of $f_1$ and $f_2$, and of $f_1$ and $f_3$ respectively.

For example, in the embodiment described above, the 150 Hz frequency would have a log index of 1, the 173 Hz frequency would have a log index of 2, and so on. Inasmuch as each nominal frequency is 1.155 times the next lower nominal frequency, the log index comparator 58 need merely subtract the log index of, e.g., $f_2$ from the log index of $f_1$, and multiply the result by 1.155 to produce the ratio $f_2/f_1$.

The ratios calculated by log index comparator 58 (or, for that matter, the log indices themselves) are applied to microprocessor 56 at inputs 60–62 respectively.

Figure 2B:
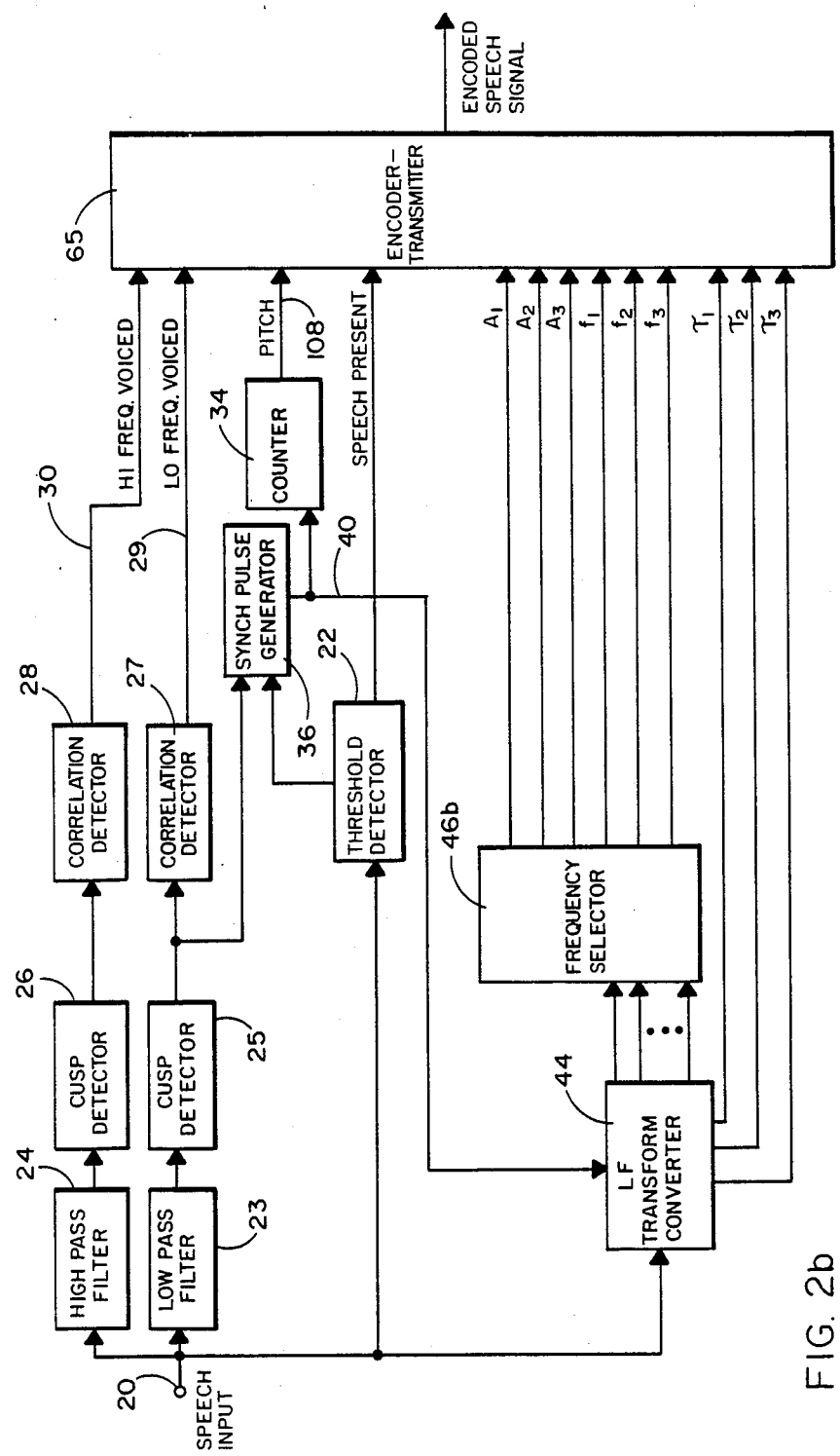

The inputs 29, 30, 57, 60, 62 and 64 provide the lookup table of microprocessor 56 with all the data necessary to recognize all basic vowels. As will be seen from Table II, the microprocessor 56 can also recognize transition vowels and consonants by noting transitions and time relationships of voiced and unvoiced frequencies. The phonemes thus identified by the microprocessor 56 can then be encoded and transmitted sequentially by encoder-transmitter 65 as numerical codes representing a sequence of phonemes.

Where bandwidth does not need to be held to an absolute minimum, and the problem is one of speech transmission, better results may be obtained with the alternative embodiment of FIG. 2b. In that embodiment, the phonemes are not identified prior to transmission; rather, the values of the significant parameters of the phonemes are transmitted directly to the receiver of FIG. 3b. The apparatus of FIG. 2b is similar to that of FIG. 2a, except that the frequency selector 46b puts out the actual values of $A_1$–$A_3$ and $f_1$–$f_3$, and that the threshold detectors, and log index comparator of FIG. 2a have been omitted.

In order to convey pitch-dependent intelligence, such as the distinction between a question and a statement, the apparatus of FIG. 2b may use a counter 34 which is connected to continuously count the number of synchronization pulses per unit time, and to put out the count on line 108 as an indication of pitch.

Speech reproduction apparatus

Unlike a synchronized Fourier transform, a synchronized Q transform cannot be used to reconstitute the original voice input signal with total accuracy. However, the accuracy produced by the reconstitution speech from a Q transform is sufficient, in terms of the human ear, to make speech clearly intelligible. In fact, transmitted speech reconstituted in accordance with this invention can be made clearer than the original. This might be done by artificially increasing the decay rates of $f_2$ and $f_3$.

Figure 3A:
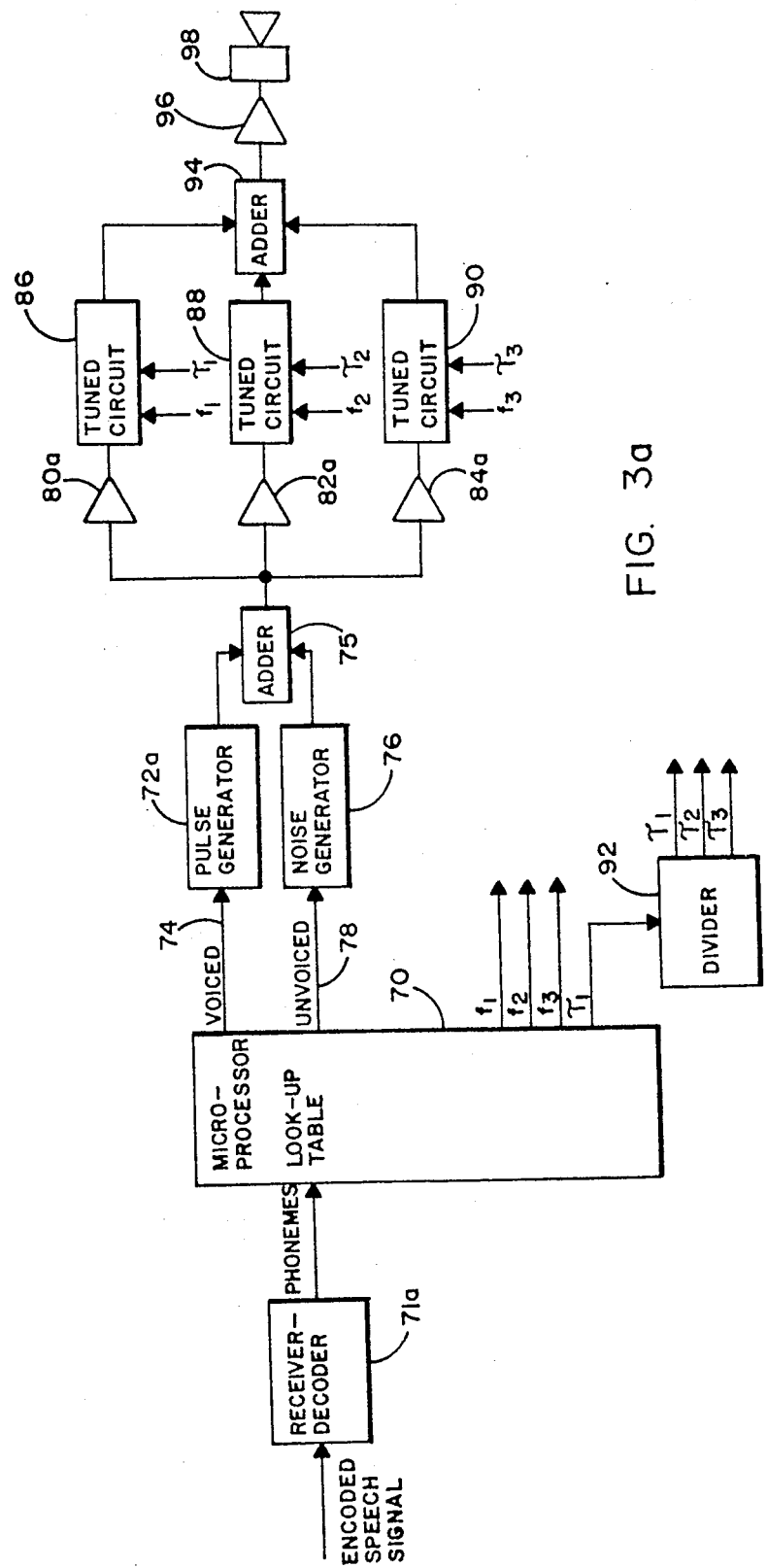
FIG. 3a is a block diagram of a speech reproduction apparatus constructed in accordance with this invention.

An apparatus for accomplishing such a reconstitution is schematically shown in FIG. 3a. In that figure, the microprocessor 70 receives from receiver-decoder 71a sequential data identifying a sequence of phonemes as encoded by the microprocessor 56 of FIG. 2a. The microprocessor 70, by means of its internal look-up table, decodes the incoming phoneme sequence. For each incoming phoneme, the microprocessor 70 determines the parameters of Table I or II which need to be satisfied to produce the identified phoneme.

If the identified phoneme is a vowel or voiced consonant, a pulse generator 72a is enabled via line 74. The pulse generator 72a has a repetition rate approximating the voice click repetition rate corresponding to the normal pitch of an average voice. The output of pulse generator 72a is applied to an adder 75. If, on the other hand, the identified phoneme is unvoiced, the microprocessor 70 enables a random noise generator 76 via line 78. The output of noise generator 76 is also applied to adder 75.

The output of adder 75 is applied to three amplifiers 80a, 82a, 84a connected, respectively, to three tuned circuits 86, 88, 90 which act as damped oscillators whose frequencies and decay rates can be electronically varied. The respective amplification factors of amplifiers 80a, 82a, 84a can be preset to represent the average amplitude relationship between the first, second and third greatest frequencies in most common voiced phonemes. In unvoiced phonemes the microprocessor uses the noise generator with or instead of the pulse generator and adds random phase shifts to the tuned circuits.

The $\tau_1$ of voiced phonemes can be used to derive approximate values of $\tau_2$ and $\tau_3$ by a divider 92 which maintains a constant ratio between $\tau_1$ and $\tau_2$, and between $\tau_1$ and $\tau_3$, respectively.

The outputs of tuned circuits 86, 88, 90 are added together in adder 94, amplified in an appropriate amplifier 96, and reconverted to speech sounds in a loudspeaker 98 or the like. The speech thus reconstituted is devoid of pitch or volume variations, but is otherwise quite readily understandable.

Figure 3B:
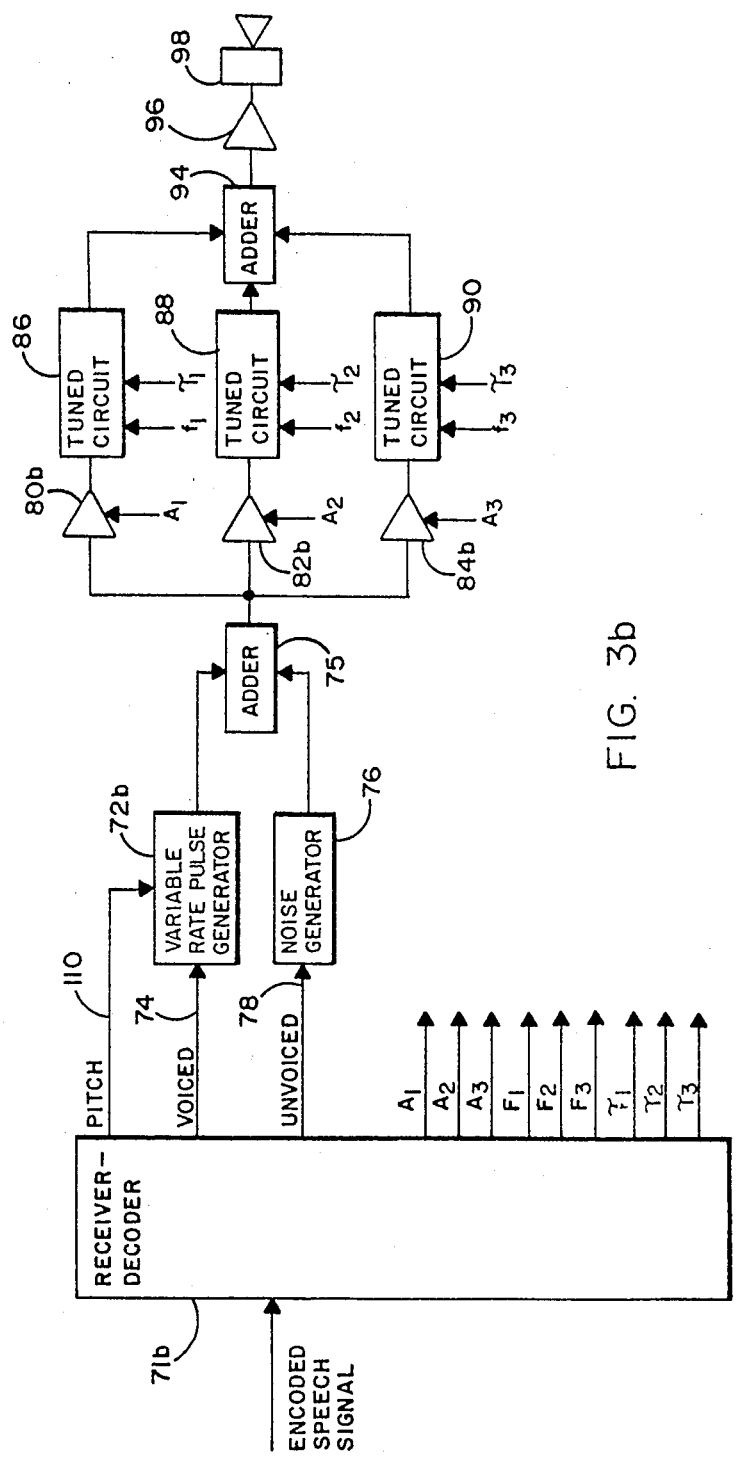

A better quality of reproduction may be achieved, at the expense of some increase in bandwidth, by using the system of FIG. 3b in conjunction with the system of FIG. 2b; In the system of FIG. 3b, the receiver-decoder 71b, instead of putting out only phoneme identifications, puts out the actual values of pitch, amplitude, frequency, and decay rate encoded in the transmitted speech signal.

The pitch value appearing on line 110 is applied to the control input of pulse generator 72b. The repetition rate of pulse generator 72b is variable under the control of the pitch signal 110 to reproduce the pitch of the voice encoded by the system of FIG. 2b.

The amplitude of unvoiced phonemes and of the first, second and third greatest frequencies defining voiced phonemes can be accurately reproduced by applying the values $A_1$, $A_2$, $A_3$ to the gain control inputs of variable-gain amplifiers 80b, 82b, 84b. The frequencies of $f_1$, $f_2$, $f_3$ and decay rates $\tau_1$, $\tau_2$, $\tau_3$ applied to tuned circuits 86, 88, 90 in the system of FIG. 3b are, of course, the actual computed values rather than the approximations produced by the system of FIGS. 2b and 3a. In all other respects, the system of FIG. 3b functions in the same manner as the system of FIG. 3a.

It will be noted from the foregoing discussion that, in the narrow-bandwidth system of FIGS. 2a and 3a, the only information which needs to be transmitted by the microprocessor 56 and 70 is a numerical code identifying one of the thirty-odd speech components of Tables I and II. Taking for example the word "ruthlessness" which takes a little more than a second to pronounce, the only pieces of information that need to be transmitted within this one-second interval are the nine phonemes which make up the word. Inasmuch as the thirty-odd phonemes of Tables I and II can be transmitted by five-bit numbers, nine eight-bit bytes are more than sufficient to transmit one second's worth of speech, with three bits per byte left over for other information. It will be readily apparent that the system of this invention lends itself to a tremendous amount of voice compression, which would allow hundreds of conversations to be multiplexed over a single digital voice circuit.

The system of FIGS. 2b and 3b is capable of reproducing the speaker's voice quite accurately because it can correctly reproduce both pitch and emphasis. Although it requires more information to be transmitted for each phoneme, the information is still in the form of one set of numbers per phoneme. Consequently, the system of FIGS. 2b and 3b retains a great deal of the bandwidth advantage of the system of FIGS. 2a and 3a as compared to conventional voice transmission systems.

The utility of the present invention is, of course, not limited to the specific apparatus described herein. Its principles are equally applicable to the visual display of sound patterns in connection with the voice training of hearing-impaired persons; in connection with voice-actuated computers; and in connection with many other artificial speech applications in which intelligibility and natural sound of the speech are more important than a faithful reproduction of the speaker's voice. In each of these applications, the system of the present invention not only opens up additional operational possibilities, but simplifies existing techniques for potentially large cost reductions.

TABLE I

CONSTANT VOWEL TABLE

| | | GROUP I | | | | GROUP 2 | | | | | | |
|---|---|---|---|---|---|---|---|---|---|---|---|---|
| f# | f | v1 | v2 | v3 | v4 | v5 | v6 | 7 | v8 | v9 | v10 | |
| 1 | 250 | oo | | | | | | | | | e | |
| 2 | 270 | oo | | | | | | | | | e | full tract |
| 3 | 296 | oo | | | | | | | | | e | |
| 4 | 323 | oo | | | | er | | | | | e | |
| 5 | 351 | oo | | | | er | | | | ih | e | |
| 6 | 383 | oo | | | | er | | | eh | ih | e | |
| 7 | 416 | approx. | oh | | | er | | | eh | ih | | |
| 8 | 453 | 12 ms decay | oh | uh | | er | | ay | eh | ih | | |
| 9 | 494 | | oh | uh | | er | ah | ay | eh | ih | | |
| 10 | 538 | | oh | uh | aw | er | ah | ay | eh | ih | | throat |
| 11 | 586 | | oh | uh | aw | er | ah | ay | eh | ih | | control |

TABLE I-continued

CONSTANT VOWEL TABLE

| f# | f | GROUP 1 | | | | GROUP 2 | | | | | | |
|---|---|---|---|---|---|---|---|---|---|---|---|---|
|   |   | v1 | v2 | v3 | v4 | v5 | v6 | 7 | v8 | v9 | v10 | |
| 12 | 638 |   | oh | uh | aw | | ah | ay | eh | | | region |
| 13 | 694 |   | oh | uh | aw | | ah | ay | eh | | | |
| 14 | 756 |   | oh | uh | aw | | ah | ay | | | | |
| 15 | 823 |   | approx. | uh | aw | | ah | ay | | | | |
| 16 | 896 |   | 6 ms decay | uh | aw | | ah | | | | | windpipe |
| 17 | 976 |   |   | approx. | aw | er | ah | | | | | resonances |
| 18 | 1063 |   |   | 4 ms decay | aw | er | | | | | | |
| 19 | 1076 |   |   |   | aw | er | | | | | | |
| 20 | 1157 |   |   |   | aw | er | | intermediate | | | | |
| 21 | 1260 |   |   |   | aw | er | | frequency | | | | |
| 22 | 1372 |   |   |   | aw | er | | region | | | | |
| 23 | 1494 |   |   |   | approx. | er | | | | | | |
| 24 | 1626 |   |   |   | 3 ms decay | er | | | | | | |
| 25 | 1771 |   |   |   |   | er | ah | ay | eh | ih | e | |
| 26 | 1926 |   |   |   |   |   | ah | ay | eh | ih | e | |
| 27 | 2100 |   |   |   |   |   | ah | ay | eh | ih | e | |
| 28 | 2287 |   |   |   |   |   | ah | ay | eh | ih | e | tongue and |
| 29 | 2490 |   |   |   |   |   | ah | ay | eh | ih | e | palate flute |
| 30 | 2711 |   |   |   |   |   | ah | ay | eh | ih | e | resonances |
| 31 | 2952 |   |   |   |   |   | ah | ay | eh | ih | e | |
| 32 | 3214 |   |   |   |   |   | ah | ay | eh | ih | e | |
| 33 | 3500 |   |   |   |   |   | ah | ay | eh | ih | e | |

Group 1 can be single decaying frequencies or up to 3 frequencies centered as shown.
Group 2 must be more than one frequency and may have significant energy in the region labeled as intermediate. Most subjects manipulate the throat region as shown. A small percentage obtain the same separation between frequencies by manipulation of the tongue and palate flute region while holding the throat region fixed.
Examples: oo (boo), oh (so), uh (bus), aw (baw), er (her), ah (hat), ay (hay), eh (bet), ih (bit), e (he)
v = vowel

TABLE II

| VOWEL | TRANSITION |   |   |   |
|---|---|---|---|---|
| | TRANSITION VOWELS | | | |
| I | I (aye) | begins as aw and ends as e | | |
| U | U | begins as e and ends as oo | | |
| CONSONANT | TRANSITION | | | |
| | VOWEL SOUND USED AS A CONSONANT | | | |
| w | (when) | a low-amplitude oo can begin or end a syllable | | |
| y | (yap) | a low amplitude e can begin or end a syllable | | |
| er | (rat) | a low amplitude er can begin or end a syllable | | |
| CONSONANT | VOICE | STOP | DETECTION KEY | |
| | STOP CONSONANTS | | | |
| | Nose and mouth are stopped. Voice sounds from chest. | | | |
| b | (bee) | on | lips | no flute/mouth frequencies in precursor |
| p | (pea) | off | lips | as in b above |
| d | (dip) | on | tongue | hiss plus tongue flute frequency |
| t | (tip) | off | tongue | as in d above |
| g | (go) | on | throat | hiss plus throat flute frequency |
| k | (kick) | off | throat | as in g above |
| | NASAL AND TONGUE MUTED SOUND CONSONANTS | | | |
| l | (lip) | yes | | uh sound muted so that glottal pulse rate is dominant |
| m | (men) | yes | | glottal pulse rate dominates |
| n | (no) | yes | | dominant glottal pulse rate plus tongue flute in the transition |
| | SIBILANT SOUNDS | | | |
| s | (sit) | no | | broad band hiss with tongue flute |
| z | (zip) | yes | | s above with voice added |
| gz | (gee) | yes | | voiced, palate flute, and broad band hiss |
| f | (fish) | no | | broad band hiss only |
| th | (this) | no | | broad band hiss with teeth/lip high f's |
| h | (hoe) | no | | broad band low amplitude hiss with vocal trace uh frequencies s may sometimes stand alone as a separate syllable preceeded and followed by stops as in (steps) |

I claim:

1. A method of identifying voiced phonemes of human speech in real time, comprising the steps of:
   (a) detecting the starting points of glottal pulses occurring in the enunciation of a voiced phoneme;
   (b) computing, for an interval beginning at a glottal pulse and ending before the next glottal pulse, an approximation of the frequency and decay rate of at least the most dominant frequency component of the speech signal between adjacent glottal pulses; and (c) generating an identification of said phoneme based on said computation.

2. The method of claim 1, further comprising the step of determining the presence within said interval of second-most dominant and third-most dominant frequency components of said speech signal above a predetermined threshold level, and computing an approximation of at least the frequencies of said second-most and third-most dominant frequency components; and also further comprising the step of computing the frequency ratios of said most dominant frequency component to said second-most and third-most dominant frequency components, respectively.

3. The method of claim 2, further comprising the step of computing the decay rates within said interval of said second-most and third-most dominant frequency components, respectively.

4. A method of identifying phonemes of human speech in real time, comprising the steps of:
（a) examining the regularity of the occurrence of cusps in the energy curve of a speech signal to determine whether the signal is voiced or unvoiced;
(b) producing synchronization pulses coincident with said cusps when the occurrence of said cusps is regular, and synchronization pulses at predetermined intervals when it is not;
(c) computing, for each synchronization pulse interval, the frequency and decay rate of at least the most dominant frequency components of the speech signal between adjacent synchronization pulses; and
(d) generating a phoneme identification based on said voiced/unvoiced determination and on the results of said computation for successive synchronization pulse intervals.

5. The method of claim 4, in which said parameters include frequency and decay rate parameters.

6. The method of claim 5, in which said frequency parameters include a formant frequency with largest amplitude, the presence or absence of secondary and tertiary formant frequency with lesser amplitudes, and the frequency ratio of said secondary and tertiary formant frequencies to said greatest formant frequency; and said decay rate parameter represents the decay rate of said greatest formant frequency.

7. The method of claim 4, in which said cusp occurrence regularity examination is performed separately on the low-frequency portion and the high-frequency portion of said speech signal.

8. The method of claim 7, in which the boundary between said low-frequency and said high-frequency portion is substantially 1 kHz.

9. Apparatus for identifying phonemes of human speech in real time, comprising:
(a) speech input means for receiving a speech signal;
(b) cusp detector means operatively connected to said speech input means for detecting cusps in the energy curve of said speech signal;
(c) correlation detector means operatively connected to said cusp detector means for producing an output indicative of the regularity of occurrence of said cusps;
(d) synch pulse generating means operatively connected to said cusp detector means and said correlation detector means for generating pulses in synchronism with said cusps when the occurrence of said cusps is substantially regular, and pulses at predetermined intervals when it is not;
(e) transform converter means operatively connected to said speech input means and said synch pulse generating means for producing an indication of the approximate frequency and decay rate of at least the most dominant frequency component of said speech signal between two adjacent synch pulses; and
(f) microprocessor means for identifying, by way of a look-up table, phonemes on the basis of said correlation detector output, the approximate frequency and decay rate of said most dominant frequency component, and the variation of said output frequency, and decay rate in successive synch pulse intervals.

10. The apparatus of claim 9, in which said transform converter means also produce an indication of the approximate frequencies of the second-most dominant and third-most dominant frequency components of said speech signal between two adjacent synch pulses, said apparatus further comprising frequency selection means for determining the presence of said second-most and third-most dominant frequency components above a predetermined threshold level, and ratio-determining means for determining the frequency ratios between the approximate frequencies of said most dominant frequency components and said second most and third-most dominant frequency components when present; said microprocessor means further using said ratios in the identification of said phonemes.

11. The apparatus of claim 10, in which said transform converter further produces an indication of the decay rates of said second-most and third-most dominant frequency components, and said microprocessor means further uses said decay rates in the identification of said phonemes.

12. The apparatus of claim 9, comprising separate correlation detectors with separate outputs for the low-frequency portion of said speech signal and for the high-frequency portion of said speech signal.

13. The apparatus of claim 12, in which said synch pulse generating means are operatively connected to said low-frequency correlation detector but not said high-frequency correlation detector.

14. The apparatus of claim 12, in which the boundary between said low-frequency portion and said high-frequency portion is substantially 1 kHz.

15. Apparatus for transmitting human speech in real time over a narrow-band channel, comprising:
(a) speech input means for receiving a speech signal;
(b) cusp detector means operatively connected to said speech input means for detecting cusps in the energy curve of said speech signal;
(c) correlation detector means operatively connected to said cusp detector means for producing an output indicative of the regularity of occurrence of said cusps;
(d) synch pulse generating means operatively connected to said cusp detector means and said correlation detector means for generating pulses in synchronism with said cusps when the occurrence of said cusps is substantially regular, and pulses at predetermined intervals when it is not;
(e) transform converter means operatively connected to said speech input means and said synch pulse generating means for producing an indication of the approximate frequency and decay rate of at least the most dominant frequency component of said speech signal between two adjacent synch pulses; and (f) transmission means operatively connected to said transform converter means and said correlation detector means for transmitting, for each synch pulse interval, signals indicative of at least the regularity of said cusp occurrence and the approximate frequency and decay rate of said most dominant frequency component.

16. The apparatus of claim 15, in which said transform converter means also produce an indication of the decay rates and approximate frequencies of the second most dominant and third-most dominant frequency components of said speech signal between two adjacent synch pulses, said apparatus further comprising frequency selection means operatively connected to said transform converter means for selecting said three most dominant frequency components and producing outputs indicative of the approximate frequency and amplitude of each of said most dominant frequency components; said transmission means being also operatively connected to said frequency selection means and being arranged to additionally transmit signals indicative of the approximate frequencies and amplitudes of at least said second-most and third-most dominant frequency components.

17. The apparatus of claim 15, further comprising counter means operatively connected to said transmission means and to said synch pulse generating means for producing an output indicative of the pulse rate of said synch pulses, said transmission means being arranged to further transmit said counter output as an indication of pitch.

18. The apparatus of claim 15, comprising separate correlation detectors with separate outputs for the low-frequency portion of said speech signal and for the high-frequency portion of said speech signal, said transmission means being arranged to transmit both of said outputs.

19. The apparatus of claim 18, in which said synch pulse generating means are operatively connected to said low-frequency correlation detector but not said high-frequency correlation detector.

20. The apparatus of claim 18, in which the boundary between said low frequency portion and said high-frequency portion is substantially 1 kHz.

21. The apparatus of claim 20, further comprising pitch determining means operatively connected to said cusp detecting means for producing a signal representative of the repetition rate of said cusps, and means for transmitting said signal.

* * * * *